United States Patent [19]
Wei

[11] Patent Number: 5,964,826
[45] Date of Patent: Oct. 12, 1999

[54] DIVISION CIRCUITS BASED ON POWER-SUM CIRCUIT FOR FINITE FIELD GF($2^M$)

[75] Inventor: Shyue-Win Wei, Hsin-Chiu, Taiwan

[73] Assignee: National Science Council, Taipei, Taiwan

[21] Appl. No.: 09/006,424

[22] Filed: Jan. 13, 1998

[51] Int. Cl.[6] .................................................. G06F 7/00
[52] U.S. Cl. ................................................................ 708/492
[58] Field of Search .................................... 708/491, 492, 708/753, 650, 656

[56] References Cited

U.S. PATENT DOCUMENTS 5,467,297  11/1995  Zook ....................................... 708/492
5,890,800  4/1999  Meyer ...................................... 708/492

*Primary Examiner*—Chuong Dinh Ngo
*Attorney, Agent, or Firm*—Tung & Associates

[57] ABSTRACT

Circuits, designed on the basis of power-sum circuits and inversion ($B^{-1}$) computation structure where B is an arbitrary elements of GF($2^m$), for performing division computations in finite field GF($2^m$), are presented. The circuit can be deemed an extension of the circuit performing inversion ($B^{-1}$) computations. With pipeline architecture and on the basis of power-sum circuits, the circuit is featured by simplicity, regularity, and broader application (applicable to arbitrary elements of the finite field) GF($2^m$).

12 Claims, 4 Drawing Sheets ing K by H) in a finite field GF($2^m$) where K and H are arbitrary elements of the finite field GF($2^m$).
DIVISION CIRCUITS BASED ON POWER-SUM CIRCUIT FOR FINITE FIELD GF($2^M$)

FIELD OF THE INVENTION

The present invention generally relates to a circuit for performing, based on the power-sum circuit disclosed in the application "power-sum circuit for finite field GF($2^m$)" filed in November of 1997, computations of K/H (divid

BACKGROUND OF THE INVENTION

Index Terms: Coding theory, finite field, power-sum, division, exponentiation, multiplicative inverse, VLSI architecture.

References:

[1] T. R. N. Rao, and E. Fujiwara, Error-Control Coding for Computer Systems. Pretice-Hall, Englewood Cliffs, N.J., 1989.

[2] R. E. Blahut, Theory and Practice of Error Control Codes. Addison-Wesley, Reading, Mass., 1983.

[3] W. W. Peterson, and E. J. Weldon, Jr., Error-Correcting Codes. 2nd ed., The MIT Press, Cambridge, Mass., 1972.

[4] S. Lin, and D. J. Costellor, Jr., Error Control Coding. Prentice Hall, Englewood Cliffs, N.J., 1983.

[5] S. W. Wei, and C. H. Wei, "High speed decoder of Reed-Solomon codes," IEEE Trans. Commun., vol.COM-41, no. 11, pp. 1588–1593, November 1993.

[6] S. R. Whitaker, J. A. Canaris, and K. B. Cameron, "Reed Solomon VLSI codec for advanced television," IEEE Trans. Circuits and Systems for Video Technology, vol.1, No.2, pp.230–236, June 1991.

[7] S. W. Wei, and C. H. Wei, "A high-speed real-time binary BCH decoder," IEEE Trans. Circuits and Systems for Video Technology, vol.3, no.2, pp. 138–147, April 1993.

[8] E. R. Berlekamp, "Bit-serial Reed-Solomon encoders," IEEE Trans. Inform Theory, vol. IT-28, pp. 869–874, 1982.

[9] C. C. Wang, T. K. Truong, H. M. Shao, L. J. Dentsch, J. K. Omura, and I. S. Reed, "VLSI architectures for computing multiplications and inverses in GF($2^m$)," IEEE Trans. Comput., vol. C-34, pp. 709–716, 1985.

[10] C. -S. Yeh, Iving S. Reed, and T. K. Truong, "Systolic multipliers for finite fields GF($2^m$)," IEEE Trans. Comput., vol. C-33, pp.357–360, 1984.

[11] B. A. Laws, Jr., and C. K. Rushforth, "A cellular-array multiplier for GF($2^m$)," IEEE Trans. Comput., vol. C-20, pp. 1573–1578, 1971.

[12] H. Okano, and H. Imai, "A construction method of high-speed decoders using ROM's for Bose-Chaudhuri-Hocquenghem and Reed-Solomon codes," IEEE Trans. Comput., vol. C-36, pp. 1165–1171, 1987.

[13] K. Araki, I. Fujita, and M. Morisue, "Fast inverter over finite field based on Euclid's algorithm," Trans. IEICE, vol. E-72, pp.1230–1234, November 1989.

[14] P. A. Scott, S. J. Simmons, S. E. Tavares, and L. E. Peppard, "Architectures for exponentiation in GF($2^m$)," IEEE J. Selected Areas in Commmun., vol.6, No.3, pp.578–586, April 1988.

[15] C. C. Wang, and D. Pei, "A VLSI design for computing exponentiations in GF($2^m$) and its application to generate pseudorandom number sequences," IEEE Trans. Comput., vol. C-39, No.2, pp. 258–262, February 1990.

[16] A. M. Odlyzko, "Discrete logarithms in finite fields and their cryptographic significance," in Adv. Cryptol., Proc. Eurocrypt'84, pp.224–314, Paris, France, April 1984.

Arithmetic Operations based on Finite Field GF($2^m$) have recently called significant attention because of their important and practical applications in the areas of computers and communications, such as the forward error-correction codes (recommended references [1]–[4]). To configure an error-correcting decoder with a high decoding speed and low circuit complexity, well designed basic arithmetic circuits in association with a powerful decoding algorithm are required. Therefore improvements in the design of finite field arithmetic circuits that yield lower circuit complexity, shorter computation delay, and higher computation speed is an extensive research topic in finite field arithmetic. Not only addition and multiplication, but also exponentiation and multiplicative inverse as well as division are essential arithmetic operations for error-correcting codes. For example, the most popular decoding procedure for a quat-error-correcting binary primitive BCH code consists of three main steps (recommended references [2]–[4]): (i) calculating the syndrome values $S_i$, i=1, 3, 5, 7 from the received word; (ii) determining the error-locator polynomial $\sigma(x)= x^4+\sigma_1 x^3+\sigma_2 x^2+\sigma_3 x+\sigma_4$ from the syndrome values, where $\sigma_1=S_1$, $\sigma_2=\{\{S_1[S_7+(S_1)^7]\}+\{S_3[S_5+(S_1)^5]\}\}/\{\{S_3[S_3+(S_1)^3]\}+\{S_3[S_5+(S_1)^5]\}\}$, $\sigma_3=(S_1)^3+S_3+S_1\sigma_2$, and $\sigma_4=\{[S_5+S_3(S_1)^2]+[S_3+(S_1)^3]\sigma_2\}/S_1[2]$; (iii) solving for the roots of $\sigma(x)$, which are the error locators. To determine the coefficients of the error locator polynomial, $\sigma_2$, $\sigma_3$, and $\sigma_4$ in such a way, not only operations for additions, multiplications, exponentiations, and inversions, but also that for divisions are required. The arts for additions and multiplications suggested by the inventor of the present invention have been disclosed in the application filed in November of 1997. One can obviously see from the above example that multiplication is one of the most frequently used field arithmetic operations. However, performing some operations, e.g. exponentiation, using ordinary multiplication might be inefficient. For instance, the above example of quat-error-correcting binary primitive BCH code requires several multiplications to calculate $[S_7+(S_1)^7]$ in $\sigma_2$, but requires only two $AB^2+C$ operations to obtain the same result (that is, $S_1[S_1(S_1)^2+0]^2+S_7$). It is confirmed by these references that the $AB^2+C$ operation is an efficient tool to implement such a computation. As will be discussed in the present invention, the $AB^2+C$ operation can also be used to efficiently execute exponentiations and inversions as well as divisions. It must be noted the $AB^2+C$ operations, exponentiations, inversions, and divisions are also frequently used in decoding other binary BCH and Reed-Solomon (RS) codes (recommended references [5]–[7]). Computations for exponentiations and inversions based on the above $AB^2+C$ operations have been disclosed by the same inventor in an application filed earlier. Division computations using the algorithm for the above exponentiations/inversions computations based on the above $AB^2+C$ operation is now disclosed in the present invention suggested by the same inventor.

As stated in the application disclosed by the same inventor and filed in November of 1997, many architectures over GF($2^m$) have already been developed upon various bases, such as a bit-serial multiplier that uses a dual basis (recommended reference [8]), a multiplicative inverter that uses a normal basis (recommended reference [9]), and a systolic multiplier that uses a standard basis (recommended reference [10]). The finite field operations of the first two types need basis conversion, whereas the third one does not. Each type of finite field operation possesses distinct features that make it suitable for specific applications. For decoders used in computers and digital communications, the standard basis is still the most frequently used basis. Therefore the division circuits suggested by the present invention are operated over the standard basis.

It is difficult to design a finite field arithmetic circuit having low circuit complexity while simultaneously maintaining a high computation speed. In general, a trade-off between computation speed and circuit complexity is often necessary.

Since division computations can be implemented by combining multiplication and inversion computations (E/F= E*F$^{-1}$, for example, where * is the multiplication operation in the Finite field and F$^{-1}$ is the inversion of F), a brief introduction to multiplication and inversion computations is shown as follows:

In principle, a multiplicative inverse can be implemented using a read-only memory (ROM) (recommended reference [12]), Euclid's algorithm (recommended reference [13]), or a number of consecutive multiplications (recommended reference [9]). Most of the architectures for computing multiplicative inverses have been developed upon the normal basis. A major reason for the development is that the squaring operation in the normal basis is just a simple cyclic shift (recommended reference [9]). Computation of exponentiation resembles the computation of multiplicative inverse. Exponentiation can also be implemented using ROM and successive multiplications. Several architectures for computing exponentiation in GF($2^m$) have been developed upon the standard as well as the normal bases (recommended reference [14]–[15]).

SUMMARY OF THE INVENTION

OBJECTS OF THE INVENTION

The general object of the present invention is to provide a circuit of simple and systematic structure for performing division computations (K/H=K*H$^{-1}$) in a finite field GF($2^m$) where H and K are arbitrary elements of GF($2^m$).

The specific object the present invention is to utilize power-product (AB$^2$) or power-sum (AB$^2$+C) computation circuits for configuring a circuit of simple and systematic structure (pipeline architecture) to perform K/H (divide K by H) or K/H+S computations in a finite field GF($2^m$), where K, H, and S are arbitrary elements in the finite field GF($2^m$), based on which, error-correction coding, that are relevant to communication, can be more conveniently and efficiently implemented.

Introduction to Algorithm for Pipeline Architecture for Division Computations in GF($2^M$) Based on Power-sum Circuits Because division computations based on power-sum circuits are actually extensions of inversion computations which in turn are extensions of exponentiation computations, discussion hereinafter is made to trace the algorithm for exponentiation and inversion computations as suggested by the same inventor in another application filed earlier.

Let P be an element of GF($2^m$), the conventional exponentiation over GF($2^m$) is defined as (recommended reference [14], [16])

$$P=R^N, \text{ where } 0 \leq N \leq n-1, \text{ and } n=2^m-1 \tag{12}$$

in which R (representing α which is popularly used in the field) is the primitive element of GF($2^m$). A more general definition of exponentiation for GF($2^m$) (recommended reference [17]) defines $$P=b^N, 0 \leq N \leq n-1, \tag{13}$$

in which b (representing β which is popularly used in the field) may be an arbitrary element of GF($2^m$). For the special case of b=R, (13) [hereinafter (n) means equation (n) and hence (13) means equation (13)] represents a conventional definition, as shown in (recommended reference [14], [16]). In this paper, we consider the more general definition of (13). For an integer N≤n−1, N can be expressed as $$N=N_0+N_1x^2+N_2x^{2^2}+\ldots+N_{m-1}x^{2^{m-1}}, \text{ where } N_i \in \{1,0\}, i=0, 1, 2, \ldots, m-1, \tag{14}$$

and may also be represented by an m-tuple vector [$N_0$ $N_1$ $N_2$ ... $N_{m-1}$], with $N_0$ called the least significant bit (LSB) and $N_{m-1}$ called the most significant bit (MSB). It is inferred from (13) and (14) that the exponentiation of b can be expressed as $$\begin{aligned}
b^N &= (b^{N0})(b^{N1 \times 2})(b^{N2 \times 2^2}) \ldots (b^{Nm-1 \times 2^{m-1}}) \\
&= (b^{N0})(b^{N1})^2(b^{N2})^{2^2} \ldots (b^{Nm-1})^{2^{m-1}} \\
&= b^{N0}\left[b^{N1}(b^{N2})^2 \ldots (b^{Nm-1})^{2^{m-2}}\right]^2 \\
&= b^{N0}\left[b^{N1}\left[(b^{N2}) \ldots (b^{Nm-1})^{2^{m-3}}\right]^2\right]^2 \\
&= \ldots \\
&= b^{N0}\left[b^{N1}\left[b^{N2}\left[\ldots\left[b^{Nm-2}(b^{Nm-1})^2\right]^2\right]^2\right]^2\right]^2
\end{aligned} \tag{15}$$

in which $b^{Ni} = b$ if $Ni = 1$ and (16)
$b^{Ni} = R^0$ (the element $\alpha^0 = 1$ of the finite field) if $Ni = 0$ Based on (15), a simple algorithm for computing exponentiation in GF($2^m$) is presented as follows (recommended reference [17]):

<Exponentiation Algorithm>

IF $N_{m-1}$ = 1 THEN P=b ELSE P=R$^0$

FOR i = m-2 TO 0

{

IF $N_i$ = 1 THEN P=P$^2$b ELSE P=P$^2$R$^0$

}

The final result is $P = b^N$.

Multiplicative inverse (inverting computation) can be considered as a special case of exponentiation because $\beta^{-1}=\beta^{\lambda-1}$ (where $\lambda=2^m-1$ and β=b which is mentioned hereinbefore). The concept of computing inverse using consecutive multiplications may be implemented for the standard basis as well as the normal basis. Most architectures have been presented for the normal basis since squaring is only a simple cyclic shift in the normal basis and a multiplicative inverse can be obtained from the condition of $\lambda=2^m-1$ as follows (recommended reference [9]):

$$\beta^{\lambda-1}=(\beta^2)(\beta^{2^2}) \ldots (\beta^{2^{m-1}})=\beta^{2+2^2+\ldots+2^{m-1}}. \tag{17}$$

(because $\lambda-1=2^m-2=2+2^2+\ldots+2^{m-1}$)

For the standard basis, it is difficult to compute an inversion using (17) since the number of multiplications is very large.

With the help of the power-sum circuit disclosed by the same inventor in the application filed November of 1997, and the architecture for exponentiation computation presented above, the task of consecutive multiplications becomes realizable with the standard basis. Since $\lambda-1$ can be expressed, as can be seen from (17), as a fixed m-tuple vector $[0\ 1\ 1\ 1\ \ldots\ 1]$, we have $N_0=0$ and $N_i=1$ for $i=1, 2, \ldots, m-1$, and it can be inferred from (15) & (16) that $$\beta^{-1} = \beta^{\lambda-1} = R^0[\beta[\beta[\ldots[\beta(\beta)^2]^2]^2]^2]^2. \quad (18)$$

It shall be understood now that an inversion operaton may be shown as follows:

<Inversion Algorithm I> (recommend reference [5])

P=b (b representing $\beta$ which is popularly used in the field)

FOR i = m-2 TO 1

{

P=bP$^2$

}

P=P$^2$

The final result is $P = b^{-1}$.

As can be represented by FIG. 1 in which $\alpha^0=R^0=$the element 1 of the finite field $GF(2^4)$ with field size of 4 and PK0, PK1, and PK2 are power-sum circuits each for computing bP$^2$ (power-sum AB$^2$ with A applied to pin 1 and B applied to pin 2) where b representing $\beta$, is an arbitrary element of the finite field <Inversion Algorithm II>

P = R$^0$ ($R^0 = \alpha^0 =$ the element 1 of the finite field)

FOR i = m-1 TO 1

{

P= bP$^2$ (b representing $\beta$ which is popularly used in the field)

}

P = P$^2$

The final result is $P = b^{-1}$.

As can be represented by FIG. 2 in which $\alpha^0=R^0=$the element of 1 of the finite field $GF(2^4)$ with field size of 4 and PK0, PK1, PK2, and PK3 are power-sum circuits each for computing bP$^2$ (power-sum AB$^2$ with A applied to pin 1 and B applied to pin 2) where b representing $\beta$, is an arbitrary element of the finite field.

Realizing that $R^0=$the element 1 of the finite field, and $K*R^0=K$ for an arbitrary element K of the finite field and the multiplication operation * in the finite field, the computation for division can then be represented as follows:

since $\beta^{-1}=\beta^{\lambda-1}=R^0[\beta[\beta[\ldots[\beta(\beta)^2]^2]^2]^2]^2$, $K*\beta^{-1}=K*R^0[\beta[\beta[\ldots[\beta(\beta)^2]^2]^2]^2]^2$ Note that $R^0=$element of 1 of the finite field, $K*R^0=K$, hence $K/\beta=K*R^0[\beta[\beta[\ldots[\beta(\beta)^2]^2]^2]^2]^2=K[\beta[\beta[\ldots[\beta(\beta)^2]^2]^2]^2]^2$ it can be seen its algorithm may be expressed as follows:

<Division Algorithm I>

P= b (b representing $\beta$ which is popularly used in the field)

FOR i = m-2 TO 1

{

P= bP$^2$

}

P = KP$^2$

The final result is P=K/b.

The algorithm can be easily understood by referring to FIG. 3 for a finite field $GF(2^4)$ with field size of 4, in which H functions as b.

Another version of computations related to division is K/b+S where + is the addition operation in the finite field and S is an arbitrary element of the finite field. It is described as follows:

<Division Algorithm II>

P= b (b representing $\beta$ which is popularly used in the field)

FOR i = m-2 TO 1

{

P= bP$^2$

}

P = KP$^2$ + S

The final result is P=K/b+S.

The algorithm can be easily understood by referring to FIG. 5 for a finite field $GF(2^4)$ with field size of 4, in which H functions as b.

The third version of division computation algorithm is to have one more power-sum circuit with its first input pin and second input pin respectively receiving, in the beginning of the computation operation, $\beta$(=b mentioned hereinbefore) and $R^0=1$, the algorithm may be represented as follows:

<Division Algorithm III>

P= R$^0$ ($R^0 = \alpha^0$, is the element 1 of the finite field)

FOR i = m-2 TO 1

{

P= bP$^2$

}

P = KP$^2$

The final result is P=K/b.

The algorithm can be easily understood by referring to FIG. 4 for a finite field $GF(2^4)$ with field size of 4, in which H functions as b and $\alpha^0=R^0=$the element of 1 of the finite field $GF(2^4)$.

Introduction to Embodied Circuits for Performing K/H and K/H+S Computations Based on the Present Invention A division circuit for performing K/H (dividing K by H) computations in a finite field $GF(2^m)$, where H and K are arbitrary elements of $GF(2^m)$, m is the field size of the finite field $GF(2^m)$, may be configured to comprise:

a group of m−1 power-sum circuits PK i , where i ranges from 0 to m−2 (i=0, 1, 2, ... , m−2), each having a first input pin, a second input pin, and an output pin for providing an output signal $Sp=A*B^2$ in response to the inputting of the A and the B respectively to the first input pin and the second input pin thereof, where * being a multiplication operation over the finite field and both the A and the B being arbitrary elements of the finite field, the second input pin of the PK i where i=m−2 inputting the H, and the first input pin of the PKi where i ranges from 1 to m−2 also inputting the H, the output pin of the PK i providing the second input pin of the $Pk_{i-1}$ with the output signal Sp for i ranging from 1 to m−2 (i=1, 2, ... , m−2), and the first input pin of the PK i for i=0 inputting the K, the K/H is obtained from the output pin of the PK i where i=0.

The above division circuit may further comprise a circuit $PK_{m-1}$ having a first input pin thereof inputting the H, a second input pin thereof inputting the element 1 of the finite field $GF(2^m)$, and an output pin thereof for providing an output signal $Sp=H*1^2$ where * being a multiplication operation over the finite field, the second input pin of the power-sum circuit PK i where i=m−2 connecting the output pin of the $PK_{m-1}$ instead of inputting H.

The above division circuit may be so configured that each of the power-sum circuits $PK_i$ where i ranges from 0 to m−2 (i=0, 1, 2, ... , m−2) respectively comprises a latch for controlling the time of providing the output signal Sp, and the H and the K pass a latch or delay element before being inputted to PKi, to assure that the first input pin and the second input pin of the power-sum circuit $PK_i$ where i ranges from 1 to m−3, respectively and simultaneously receives the H and the Sp which is provided by Pkj where j=i+1, and that the first input pin and the second input pin of the power-sum circuit $PK_i$ where i=0, respectively and simultaneously receives the K and the Sp which is provided by PKi where i=1.

The above division circuit may comprise, instead of those latches or delay elements for latching or delaying H and K before inputting to PKi, a clock pulse generator for generating a sequence of clock pulses $P_n$ where n ranges from 1 to an integer G which is not smaller than m−1, the first input pin of the power-sum circuit $PK_i$ inputting the H in response to the clock pulses $P_n$ in such a way that when both the first input pin and the second input pin of the power-sum circuit $PK_{m-i}$ where i=2, inputs the H in response to the J-th (J is a positive integer) pulse of the clock pulses, the first input pin and the second input pin of the power-sum circuit $PK_{m-k}$ where k ranges from 3 to m−1, respectively inputs, in response to the (J+k−i)-th pulse of the clock pulses where i=2, the H and the Sp which is provided by the $PK_{m-k+1}$, for (J+k−i)≦G, while the first input pin and the second input pin of the power-sum circuit $PK_{m-k}$ where k=m respectively inputs, in response to the (J+k−i)-th pulse of the clock pulses where i=2, the K and the Sp which is provided by the $PK_{m-k+1}$ for (J+k−i)≦G.

The above division circuit in which a clock pulse generator is configured may comprise an input auxiliary circuit for controlling the first input pin of the power-sum circuit $PK_{m-k}$ where k ranges from 3 to m, to input the element of zero of the finite field in response to the y-th pulse of the clock pulses where y ranges from J+1 to J+k−i for i=2.

The above division circuit may be so configured that the power-sum circuit $PK_0$ further comprises a third input pin thereof for inputting an arbitrary element S of the finite field to output an element K/H+the S through the output pin thereof, where + is a sum operation in the finite field $GF(2^m)$.

Another version of a division circuit (called one-stage division circuit) for performing K/H (dividing K by H) computations in a finite field $GF(2^m)$, where H and K are arbitrary elements of $GF(2^m)$, m is the field size of the finite field $GF(2^m)$, may be configured to comprise:

a multiplex circuit inputting the H and the K for providing a sequence of output signal $Ou_i$ ($Ou_1$, ... , $Ou_m$) where $Ou_i$=the H for i ranging from 1 to m−1 and $Ou_m$ the K; and a power-sum circuit PK having a first input pin thereof receiving the sequence of output signal $Ou_i$, a second input pin thereof receiving an arbitrary element E of the finite field applied thereto, and an output pin thereof providing an output signal Sp=the $Ou_i*(\text{the } E)^2$ where * being a multiplication operation over the finite field, the element of 1 of the finite field being applied to the second input pin of the PK when the power-sum circuit PK receives the $Ou_i$ where i=1, and the output signal Sp being applied to the second input pin of the PK when the power-sum circuit PK receives the $Ou_i$ where i ranges from 2 to m, the output signal Sp provided by the output pin of the power-sum circuit when the power-sum circuit PK receives the $Ou_i$ where i=m, is the K/H.

The division circuit (one-stage division circuit) may be so configured that the multiplex circuit further is controlled by a bit sequence of $N_i$, where $N_i$=1 for i ranging from 1 to m−1 ($N_1$, ... , $N_{m-1}$), and $N_m$=0, to set the $Ou_i$ which equals the H when $N_i$=1, and equals the K when $N_m$=0, whereby the $Ou_i$=the H for i ranging from 1 to m−1, and the $Ou_i$=K for i=m.

The division circuit (one-stage division circuit) may also be configured to comprise a first switch and a second switch, the first switch inputting both the element of 1 of the finite field and the output signal Sp, to apply the element of 1 of the finite field to the second input pin of the PK when the power-sum circuit PK receives the $Ou_i$ where i=1, and to apply the output signal Sp to the second input pin of the PK when the power-sum circuit PK receives the $Ou_i$ where i ranges from 2 to m (i=2, ... , m), the second switch inputting the output signal Sp to provide a controlled output signal when the power-sum circuit PK receives the $Ou_i$ where i=m, whereby the controlled output signal is the K/H.

The division circuit (one-stage division circuit) may also be configured to comprise a clock pulse generator for generating a first sequence of pulses and a second sequence of pulses, the first sequence of pulses controlling the first switch and the multiplex circuit in such a way that when the multiplex circuit inputs the $N_i$ where i=1 in response to the J-th pulse of the first sequence of pulses, the first switch applies the element of 1 of the finite field to the second input pin of the PK in response to the J-th pulse of the first sequence of pulses, and the multiplex circuit inputs $N_i$ where i ranges from 2 to m, in response to the (J+i−1)-th pulse of the first sequence of pulses, while the first switch applies the output signal Sp to the second input pin of the PK in response to the (J+i−1)-th pulse of the first sequence of pulses where i ranges from 2 to m; the second sequence of pulses controlling the second switch to provide the controlled output signal only when the power-sum circuit PK receives the $Ou_i$ where i=m, whereby the controlled output signal is the K/H.

The division circuit (one-stage division circuit) may also be configured to comprise a latch circuit to control the time for the power-sum circuit PK to receive the $Ou_i$, and the time for the PK to receive both the element of 1 of the finite field and the output signal Sp which is applied thereto by the first switch, whereby the power-sum circuit PK simultaneously receives the element of 1 of the finite field and the $Ou_i$ where i=1, and simultaneously receives the $Ou_i$ and the output signal Sp which is provided by the power-sum circuit PK in response to the $Ou_{i-1}$ where i ranges from 2 to m.

The division circuit (one-stage division circuit) may also be so configured that the power-sum circuit PK further comprises a third input pin thereof for inputting an arbitrary element S of the finite field when the second switch inputs the output signal Sp to provide the controlled output signal, whereby the controlled output signal is the K/H+the S, where + is a sum operation in the finite field $GF(2^m)$.

DETAILED DESCRIPTION OF THE PREFERRED EMBODIMENTS

Figure 1:
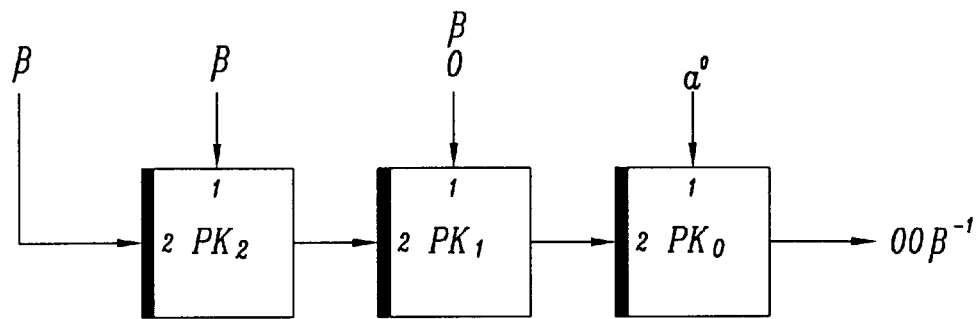
FIG. 1 shows an inversion circuit composed of power-sum circuits, based on which a division circuit can be easily conceived for a finite field $GF(2^4)$ of field size of 4.
Figure 2:
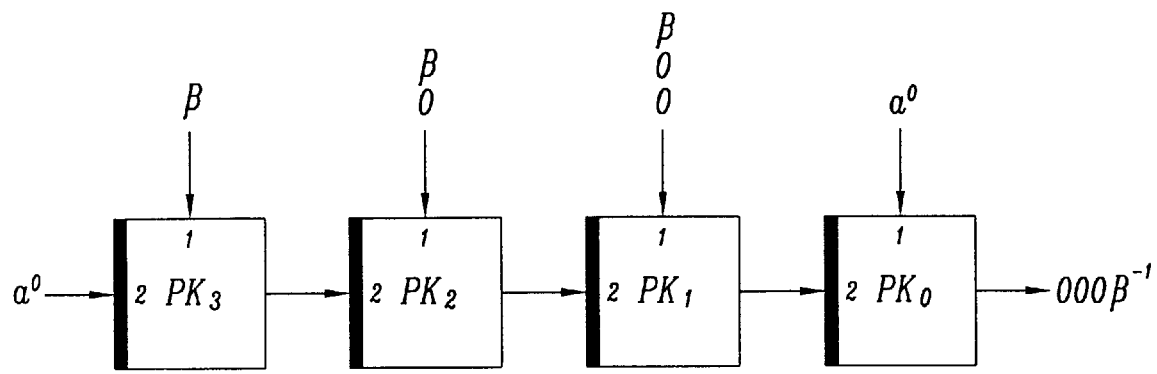
FIG. 2 shows another inversion circuit composed of power-sum circuits, based on which another division circuit can be easily conceived for a finite field $GF(2^4)$ of field size of 4.
Figure 3:
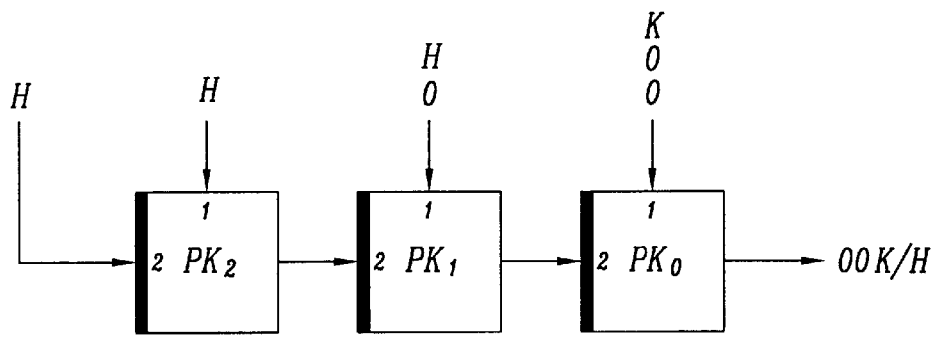
FIG. 3 shows a multi-stage pipeline architecture of a division circuit based on the analogous configuration shown in FIG. 1 for finite field $GF(2^4)$.

The present invention may best be understood through the following description with reference to the accompanying drawings, in which:

Shown in FIG. 3 is a division circuit for performing K/H (dividing K by H) computations in a finite field $GF(2^4)$, where $GF(2^4)$ is a special case of $GF(2^m)$ for field size m=4, and both H and K are arbitrary elements of $GF(2^4)$. The division circuit comprises:

a group of m−1 power-sum circuits PK i, where i ranges from 0 to m−2 (i=0, 1, 2, ..., m−2, here m=4, hence i=0, 1, 2), each having a first input pin 1, a second input pin 2, and an output pin for providing an output signal $Sp=A*B^2$ in response to the inputting of A and B respectively to the first input pin and the second input pin thereof, where * being a multiplication operation over the finite field and both A and B being arbitrary elements of the finite field, the second input pin of the PK i where i=m−2 (i.e., Pk2 in this case) inputting the H, and the first input pin of the Pki where i ranges from 1 to m−2 also inputting the H, the output pin of the PK i providing the second input pin of the $Pk_{i-1}$ with the output signal Sp for i ranging from 1 to m−2 (i=1, 2, ..., m−2), and the first input pin of the PK i for i=0 inputting the K, the K/H is obtained from the output pin of the PK i where i=0.

Figure 4:
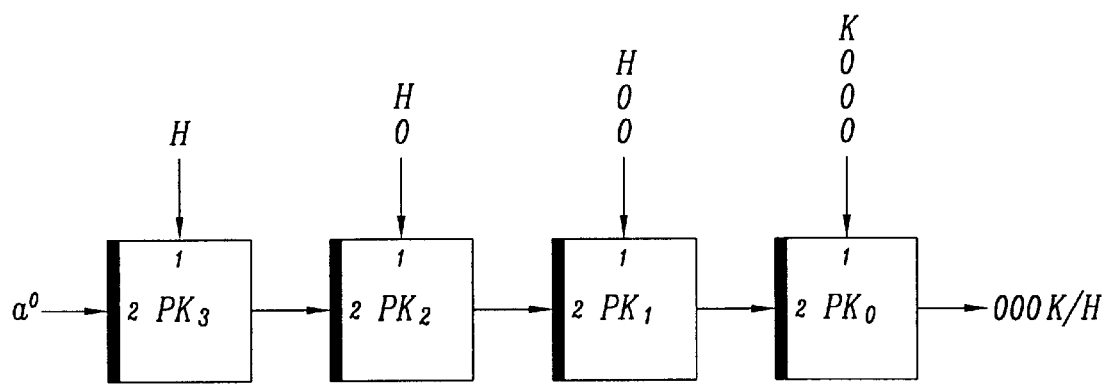
FIG. 4 shows another multi-stage pipeline architecture of a division circuit based on the analogous configuration shown in FIG. 2 for finite field $GF(2^4)$.

The above division circuit may further comprise a circuit $PK_{m-1}$ (i.e., PK3 in this special case) as shown in FIG. 4, having a first input pin 1 thereof inputting the H, a second input pin 2 thereof inputting the element 1 of the finite field $GF(2^m)$, and an output pin thereof for providing an output signal $Sp=H*1^2$ where * being a multiplication operation over the finite field $GF(2^m)$, the second input pin of the power-sum circuit PK i where i=m−2 connecting the output pin of the $PK_{m-1}$ instead of inputting H.

Figure 7:
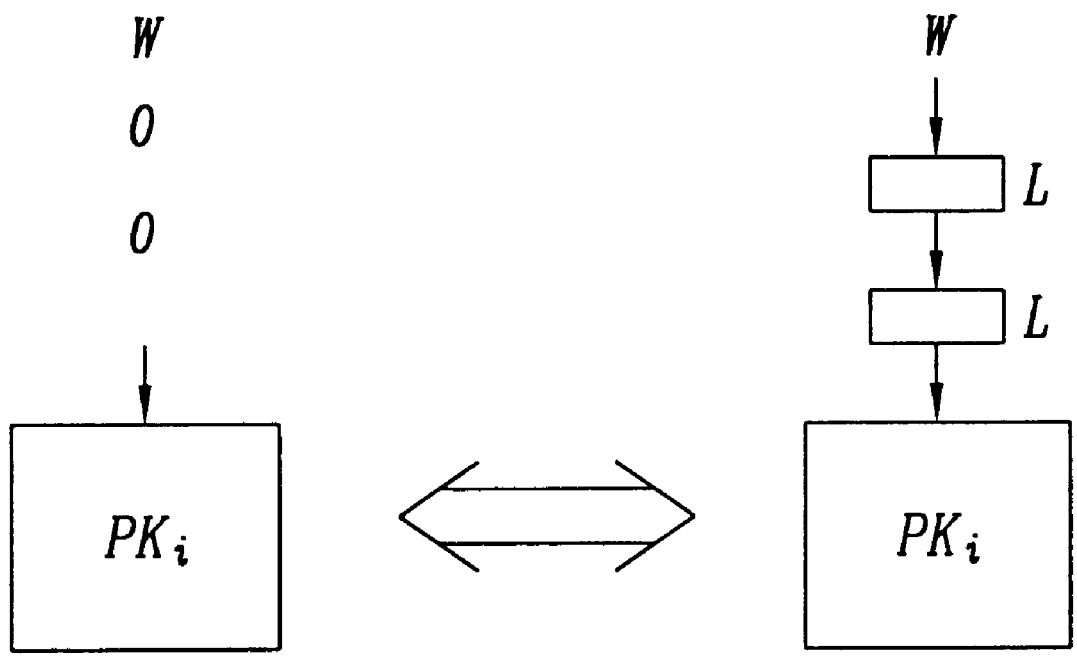
FIG. 7 shows two ways of delaying the inputting of an element to a power-sum circuit.

The above division circuit shown in FIG. 3 or FIG. 4 may be so configured that each of the power-sum circuits $PK_i$ where i ranges from 0 to m−2 (i=0, 1, 2, ..., m−2) respectively comprises a latch associated with its output pin for controlling the time of providing the output signal Sp, and the H and the K pass a latch or delay element before being inputted to PKi, as can be seen from FIG. 7 where an arbitrary element w of the finite field functions as H or K, to assure that the first input pin 1 and the second input pin 2 of the power-sum circuit $PK_i$ where i ranges from 1 to m−3, respectively and simultaneously receives the H and the Sp which is provided by Pkj where j=i+1, and that the first input pin and the second input pin of the power-sum circuit $PK_i$ where i=0, respectively and simultaneously receives the K and the Sp which is provided by PKi where i=1.

Figure 5:
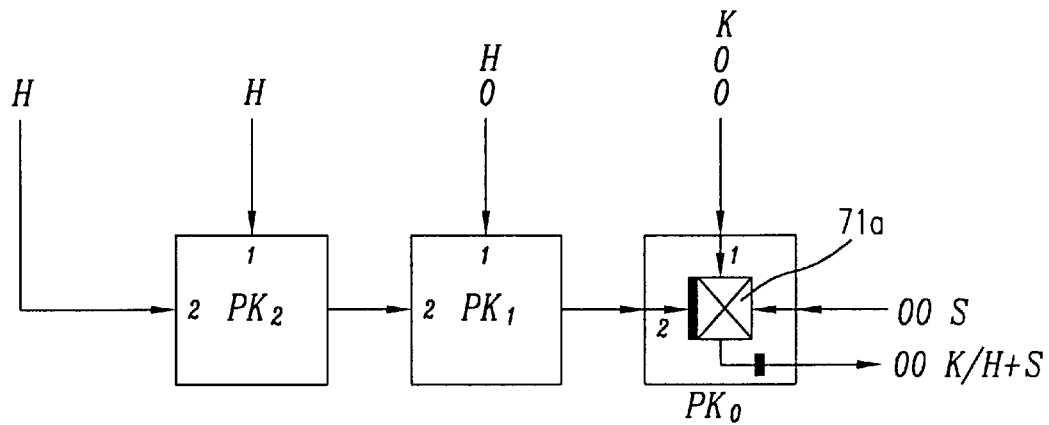
FIG. 5 shows a pipeline architecture of a division circuit for performing K/H+S computations for finite field $GF(2^4)$.

The above division circuit may be so configured that the power-sum circuit $PK_0$ further comprises a third input pin thereof, as shown in FIG. 5, for inputting an arbitrary element S of the finite field to output an element K/H+S through the output pin thereof, where + is a sum operation in the finite field.

Figure 6:
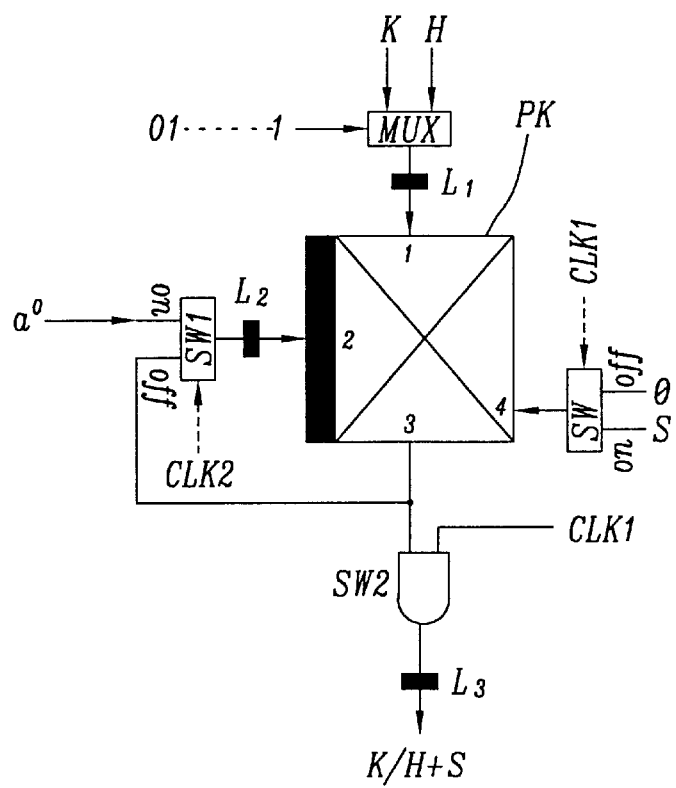
FIG. 6 shows a one-stage pipeline architecture of a division circuit for finite field $GF(2^4)$.

Another version of a division circuit (called one-stage division circuit) for performing K/H (dividing K by H) computations in a finite field $GF(2^m)$, where H and K are arbitrary elements of $GF(2^m)$, m is the field size of the finite field $GF(2^m)$, may be configured as shown in FIG. 6 to comprise:

a multiplex circuit MUX inputting the H and the K for providing a sequence of output signal $Ou_i$ ($Ou_1, ..., Ou_m$) to the first input pin 1 of a power-sum circuit PK, where $Ou_i$=the H for i ranging from 1 to m−1 and $Ou_m$=the K; and power-sum circuit PK having its first input pin thereof receiving the sequence of output signal $Ou_i$ provided by multiplex circuit MUX, a second input pin 2 thereof receiving an arbitrary element E of the finite field applied thereto, and an output pin 3 thereof providing an output signal Sp=the $Ou_i*E^2$ where * being a multiplication operation over the finite field, the element of 1 of the finite field being applied to the second input pin 2 of power-sum circuit PK when the power-sum circuit PK receives the $Ou_i$ where i=1, and the output signal Sp being applied to the second input pin 2 of the power-sum circuit PK when the power-sum circuit PK receives the $Ou_i$ where i ranges from 2 to m, the output signal Sp provided by the output pin 3 of the power-sum circuit PK when the power-sum circuit PK receives the $Ou_i$ where i=m, is the K/H.

The division circuit (one-stage division circuit) may be so configured that the multiplex circuit further is controlled by a bit sequence of $N_i$, where $N_i$=1 for i ranging from 1 to m−1 ($N_1, ..., N_{m-1}$), and $N_m$=0, to set the $Ou_i$ which equals H when $N_i$=1, and equals K for $N_m$ (=0), whereby the $Ou_i$=H for i ranging from 1 to m−1, and the $Ou_i$=K for i=m.

The division circuit (one-stage division circuit) may also be configured to comprise a first switch sw1 and a second switch sw2, the first switch sw1 inputting both the element of 1 of the finite field and the output signal Sp, to apply the element of 1 of the finite field to the second input pin 2 of PK when the power-sum circuit PK receives the $Ou_i$ where i=1, and to apply the output signal Sp to the second input pin 2 of the PK when the power-sum circuit PK receives the $Ou_i$ where i ranges from 2 to m (i=2, . . . , m), the second switch sw2 inputting the output signal Sp to provide a controlled output signal when the power-sum circuit PK receives the $Ou_i$ where i=m, whereby the controlled output signal is the K/H.

The division circuit (one-stage division circuit) in FIG. 6 may also be configured to comprise a clock pulse generator for generating a first sequence of pulses and a second sequence of pulses, the first sequence of pulses controlling the first switch sw1 and the multiplex circuit MUX in such a way that when the multiplex circuit MUX inputs the $N_i$ where i=1 in response to the J-th pulse of the first sequence of pulses, the first switch sw1 applies the element of 1 of the finite field to the second input pin 2 of the PK in response to the J-th pulse of the first sequence of pulses, and the multiplex circuit MUX inputs $N_i$ where i ranges from 2 to m, in response to the (J+i−1)-th pulse of the first sequence of pulses, while the first switch sw1 applies the output signal Sp to the second input pin 2 of the PK in response to the (J+i−1)-th pulse of the first sequence of pulses where i ranges from 2 to m; the second sequence of pulses controlling the second switch sw2 to provide the controlled output signal only when the power-sum circuit PK receives the $Ou_i$ where i=m, whereby the controlled output signal is the K/H.

The division circuit (one-stage division circuit) may also be configured to comprise a latch circuit L1 and L2 to control the time for the power-sum circuit PK to receive the $Ou_i$, and the time for the PK to receive both the element of 1 of the finite field and the output signal Sp which is applied thereto by the first switch sw1, whereby the power-sum circuit PK simultaneously receives the element of 1 of the finite field and the $Ou_i$ where i=1, and simultaneously receives the $Ou_i$ and the output signal Sp which is provided by the power-sum circuit PK in response to the $Ou_{i-1}$ where i ranges from 2 to m.

The division circuit (one-stage division circuit) may also be so configured that the power-sum circuit PK further comprises a third input pin 4 thereof for inputting an arbitrary element S of the finite field when the second switch sw2 inputs the output signal Sp to provide the controlled output signal, whereby the controlled output signal is the K/H+the S, where + is a sum operation in the finite field.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A division circuit for performing K/H (dividing K by H) computations in a finite field $GF(2^m)$, where H and K are arbitrary elements of $GF(2^m)$, m is the field size of said fnite field $GF(2^m)$, said division circuit comprising:

a group of m−1 power-sum circuits PK i, where i ranges from 0 to m−2 (i=0, 1, 2, . . . , m−2), each having a first input pin, a second input pin, and an output pin for providing an output signal $Sp=A*B^2$ in response to the inputting of said A and said B respectively to said first input pin and said second input pin thereof, where * being a multiplication operation over said finite field and both said A and said B being arbitrary elements of said finite field, said second input pin of said PK i where i=m−2 inputting said H, and said first input pin of said PKi where i ranges from 1 to m−2 also inputting said H, said output pin of said PK i providing said second input pin of said $Pk_{i-1}$ with said output signal Sp for i ranging from 1 to m−2 (i=1, 2, . . . , m−2), and said first input pin of said PK i for i=0 inputting said K, said K/H is obtained from said output pin of said PK i where i=0.

2. The division circuit according to claim 1 further comprising a circuit $PK_{m-1}$ having a first input pin thereof inputting said H, a second input pin thereof inputting the element 1 of said finite field $GF(2^m)$, and an output pin thereof for providing an output signal $Sp=H*1^2$ where * being a multiplication operation over said finite field, said second input pin of said power-sum circuit PK i where i=m−2 connecting said output pin of said $PK_{m-1}$ instead of inputting H.

3. The division circuit according to claim 1 wherein each of said power-sum circuits $PK_i$ where i ranges from 0 to m−2 (i=0, 1, 2, . . . , m−2) respectively comprises a latch for controlling the time of providing said output signal Sp, to assure that said first input pin and said second input pin of said power-sum circuit $Pk_i$ where i ranges from 1 to m−3, respectively and simultaneously receives said H and said Sp which is provided by Pkj where j=i+1, and that said first input pin and said second input pin of said power-sum circuit $Pk_i$ where i=0, respectively and simultaneously receives said K and said Sp which is provided by PK i=1.

4. The division circuit according to claim 1 further comprising a clock pulse generator for generating a sequence of clock pulses $P_n$ where n ranges from 1 to an integer G which is not smaller than m−1, said first input pin of said power-sum circuit $PK_i$ inputting said H in response to said clock pulses $P_n$ in such a way that when both said first input pin and said second input pin of said power-sum circuit $PK_{m-i}$ where i=2, inputs said H in response to the J-th (J is a positive integer) pulse of said clock pulses, said first input pin and said second input pin of said power-sum circuit $PK_{m-k}$ where k ranges from 3 to m−1, respectively inputs, in response to the (J+k−i)-th pulse of said clock pulses where i=2, said H and said Sp which is provided by said $PK_{m-k+1}$, for (J+k−i)≦G, while said first input pin and said second input pin of said power-sum circuit $PK_{m-k}$ where k=m respectively inputs, in response to the (J+k−i)-th pulse of said clock pulses where i=2, said K and said Sp which is provided by said $PK_{m-k+1}$ for (J+k−i)≦G.

5. The division circuit according to claim 4 further comprising an input auxiliary circuit for controlling said first input pin of said power-sum circuit $PK_{m-k}$ where k ranges from 3 to m, to input the element of zero of said finite field in response to the y-th pulse of said clock pulses where y ranges from J+1 to J+k−i for i=2.

6. The division circuit according to claim 1 wherein said power-sum circuit $PK_0$ further comprises a third input pin thereof for inputting an arbitrary element S of said finite field to output an element K/H+said S through said output pin thereof, where + is a sum operation in said finite field.

7. A division circuit for performing K/H (dividing K by H) computations in a finite field $GF(2^m)$, where H and K are arbitrary elements of $GF(2^m)$, m is the field size of said finite field $GF(2^m)$, said division circuit comprising:

a multiplex circuit inputting said H and said K for providing a sequence of output signal $Ou_i$ ($Ou_1$, . . . , $Ou_m$) where $Ou_i$=said H for i ranging from 1 to m−1 and $Ou_m$ said K; and a power-sum circuit PK having a first input pin thereof receiving said sequence of output signal $Ou_i$, a second input pin thereof receiving an arbitrary element E of said finite field applied thereto, and an output pin thereof providing an output signal Sp=said $Ou_i$*(said E)$^2$ where * being a multiplication operation over said finite field, said second input pin of said PK inputting the element of 1 of said finite field when said power-sum circuit PK receives said $Ou_i$ where i=1, and said output signal Sp being received by said second input pin of said PK when said power-sum circuit PK receives said $Ou_i$ where i ranges from 2 to m, said output signal Sp provided by said output pin of said power-sum circuit when said power-sum circuit PK receives said $Ou_i$ where i=m, is said K/H.

8. The division circuit according to claim 7 wherein said multiplex circuit further is controlled by a sequence of $N_i$, where $N_i$=bit 1 for i ranging from 1 to m−1 ($N_1, \ldots, N_{m-1}$), and $N_m$=bit 0, to provide said $Ou_i$ which equals said H when $N_i$=1, and equals said K when $N_m$=0, whereby said $Ou_i$=said H for i ranging from 1 to m−1, and said $Ou_i$=K for i=m.

9. The division circuit according to claim 8 further comprising a first switch and a second switch, said first switch inputting both said element of 1 of said finite field and said output signal Sp, to apply said element of 1 of said finite field to said second input pin of said PK when said power-sum circuit PK receives said $Ou_i$ where i=1, and to apply said output signal Sp to said second input pin of said PK when said power-sum circuit PK receives said $Ou_i$ where i ranges from 2 to m (i=2, . . . , m), said second switch inputting said output signal Sp to provide a controlled output signal when said power-sum circuit PK receives said $Ou_i$ where i=m, whereby said controlled output signal is said K/H.

10. The division circuit according to claim 9 further comprising a clock pulse generator for generating a first sequence of pulses and a second sequence of pulses, said first sequence of pulses controlling said first switch and said multiplex circuit in such a way that when said multiplex circuit inputs said $N_i$ where i=1 in response to the J-th pulse of said first sequence of pulses, said first switch applies said element of 1 of said finite field to said second input pin of said PK in response to the J-th pulse of said first sequence of pulses, and said multiplex circuit inputs $N_i$ where i ranges from 2 to m, in response to the (J+i−1)-th pulse of said first sequence of pulses, while said first switch applies said output signal Sp to said second input pin of said PK in response to the (J+i−1)-th pulse of said first sequence of pulses where i ranges from 2 to m; said second sequence of pulses controlling said second switch to provide said controlled output signal only when said power-sum circuit PK receives said $Ou_i$ where i=m, whereby said controlled output signal is said K/H.

11. The division circuit according to claim 10 further comprising a latch circuit to control the time for said power-sum circuit PK to receive said $Ou_i$, and the time for said PK to receive both said element of 1 of said finite field and said output signal Sp which is applied thereto by said first switch, whereby said power-sum circuit PK simultaneously receives said element of 1 of said finite field and said $Ou_i$ where i=1, and simultaneously receives said $Ou_i$ and said output signal Sp which is provided by said power-sum circuit PK in response to said $Ou_{i-1}$ where i ranges from 2 to m.

12. The division circuit according to claim 9 wherein said power-sum circuit PK further comprises a third input pin thereof for inputting an arbitrary element S of said finite field when said second switch inputs said output signal Sp to provide said controlled output signal, whereby said controlled output signal is said K/H+said S, where + is a sum operation in said finite field GF($2^m$).

* * * * *